June 26, 1956  W. M. McCONNELL  2,751,781
POSITIONING APPARATUS FOR ELONGATED ARTICLES
TO BE DELIVERED TO A MACHINE
Filed Jan. 7, 1953  8 Sheets-Sheet 1

Fig. 1

INVENTOR.
William M. McConnell
BY Wett, Mackey & Burden
HIS ATTORNEYS

Fig. 2

INVENTOR.
William M. McConnell
BY
HIS ATTORNEYS

June 26, 1956 W. M. McCONNELL 2,751,781
POSITIONING APPARATUS FOR ELONGATED ARTICLES
TO BE DELIVERED TO A MACHINE
Filed Jan. 7, 1953 8 Sheets-Sheet 3

Fig. 3

INVENTOR.
William M. McConnell
BY
HIS ATTORNEYS

United States Patent Office 2,751,781
Patented June 26, 1956

2,751,781

POSITIONING APPARATUS FOR ELONGATED ARTICLES TO BE DELIVERED TO A MACHINE

William Mynard McConnell, McKeesport, Pa., assignor to Taylor-Wilson Manufacturing Company, Pittsburgh, Pa., a corporation of Pennsylvania Application January 7, 1953, Serial No. 330,116

15 Claims. (Cl. 73—49.6)

This invention relates to apparatus for positioning an article with respect to means intended to receive it and then, as a result of the positioning, locating the receiving means in accordance with the size of the article to be received.

In many industrial processes, it is necessary to advance elongated articles such as pipes, tubes, bars, rods, slabs, and the like to apparatus having means to engage and hold the ends of such articles for a subsequent operation. For example, in the hydraulic testing of pipe, the practice is to engage the opposite ends of the pipe with aligned test heads. For a given setting of the test heads, at least one of the heads is movable toward and away from the other in order that the heads may bear against the pipe and make a water-tight joint with the ends. A test fluid such as water fills the pipe usually through a passage in one of the heads, and a pressure intensified may then increase the fluid pressure to effect the hydraulic test.

Since successive pipes or like articles may vary considerably in length, it has heretofore been a source of delay and inconvenience to alter the setting of the test heads or similar end-engaging means each time an article of different length was to be processed.

The present invention provides apparatus that automatically compensates for changes in length of successive pipe advanced to receiving apparatus of the type mentioned and spaces the end-engaging means of such apparatus to a distance at least equal to the length of the next succeeding pipe. In one form, an aligner positions a pipe adjacent the test heads, for instance, of a hydraulic tester. The aligner carries an actuator which is simultaneously positioned as the pipe is aligned. After transfer of the pipe to the test heads and in accordance with the resulting position of the actuator, the latter directs a movable test head to a testing position commensurate with the size of the pipe just aligned.

Subsequently, after the testing of that pipe, and upon alignment of a succeeding pipe, the actuator, in accordance with its new position, directs the movable test head to a second position at which the two test heads are sufficiently spaced to receive the succeeding pipe regardless of whether that pipe is longer, shorter, or of the same length as the preceding pipe just tested. After the receipt by the test heads of the succeeding pipe, the actuator, if necessary again directs the movable test head to a testing position commensurate with the size of the succeeding pipe, as before.

The accompanying drawings illustrate a presently preferred embodiment wherein.

By way of disclosing the functions and operation of the positioning apparatus and without intending to limit the claims, the present apparatus is shown in conjunction with a hydraulic tester for pipes which is more fully disclosed and claimed in a copending application of Willim M. McConnell and John R. Von Hofen, entitled Automatic Follow-Up Control for Test Head of Pipe-Testing Machine, filed September 6, 1951, Serial No. 245,304. This copending application Serial No. 245,304 is United States Patent No. 2,707,876. The present positioning apparatus, however, is adapted and intended to apply to any receiving apparatus having at least two engaging means of which at least one is movable with respect to the other.

Construction

Figure 1:
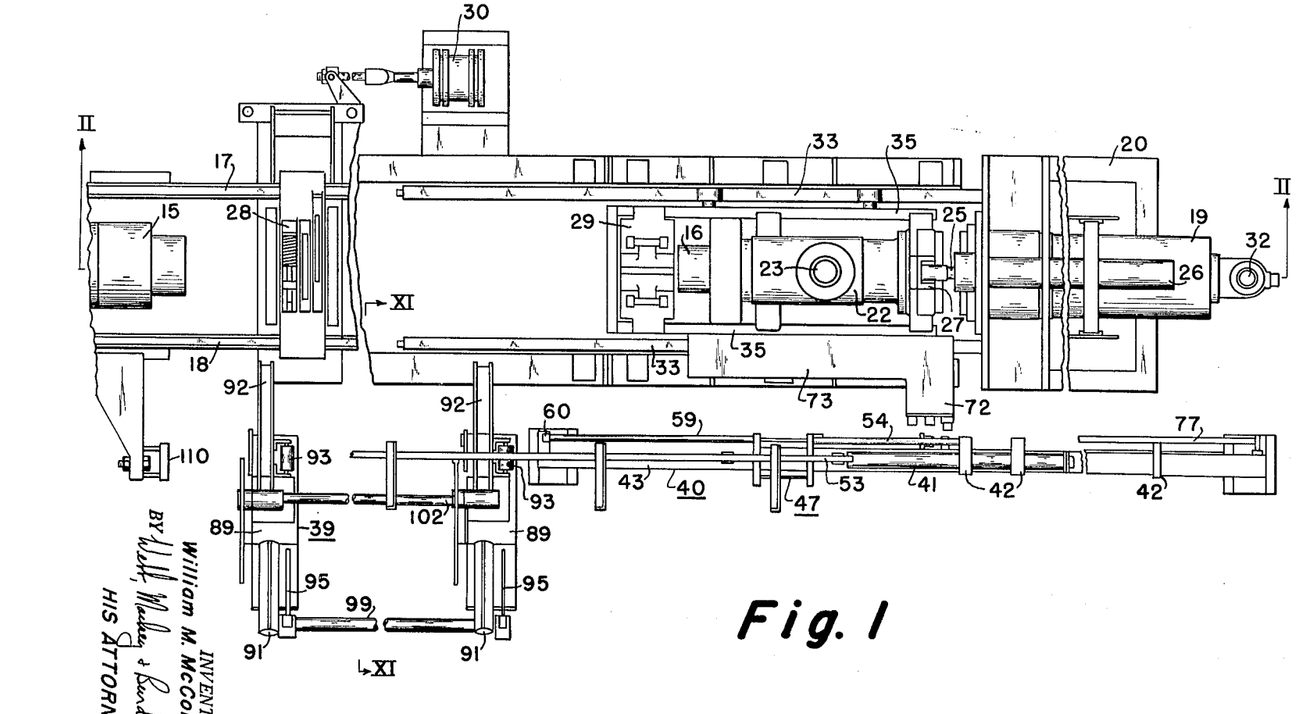
Figure 1 is a plan view of the positioning apparatus which is shown in conjunction with a hydraulic tester for pipes.
Figure 2:
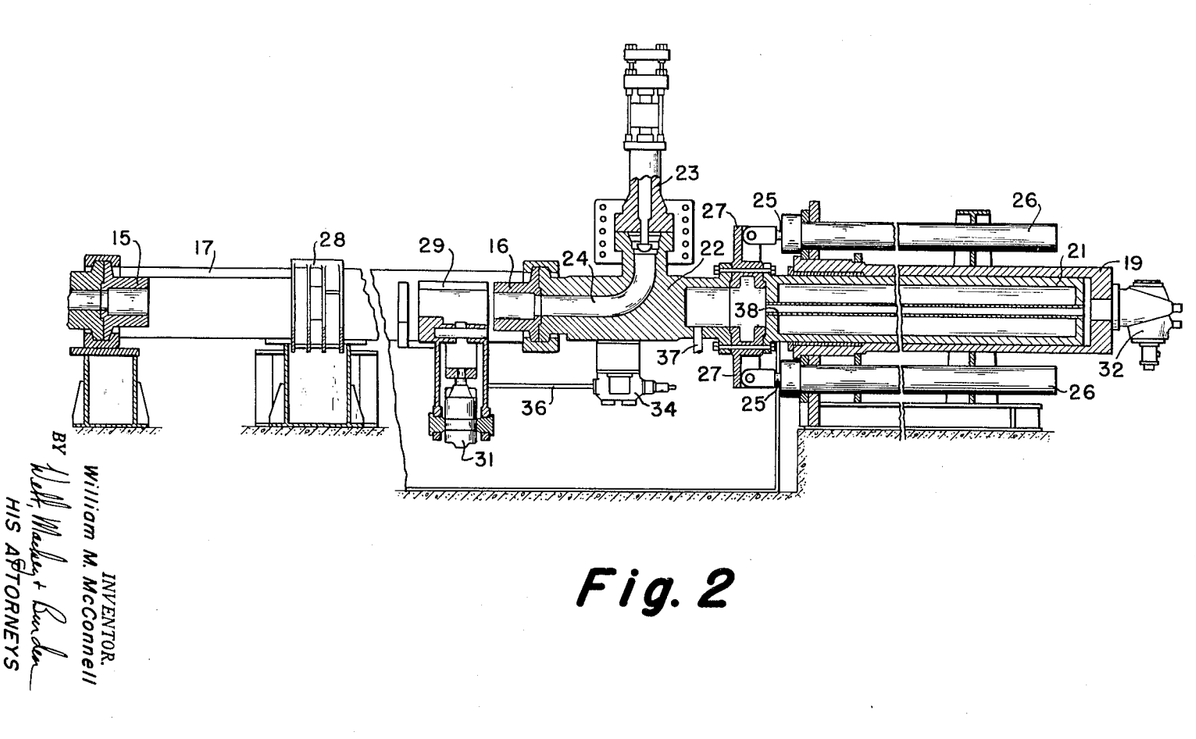
Figure 2 is a section of Figure 1 on the line II—II.
Figure 3:
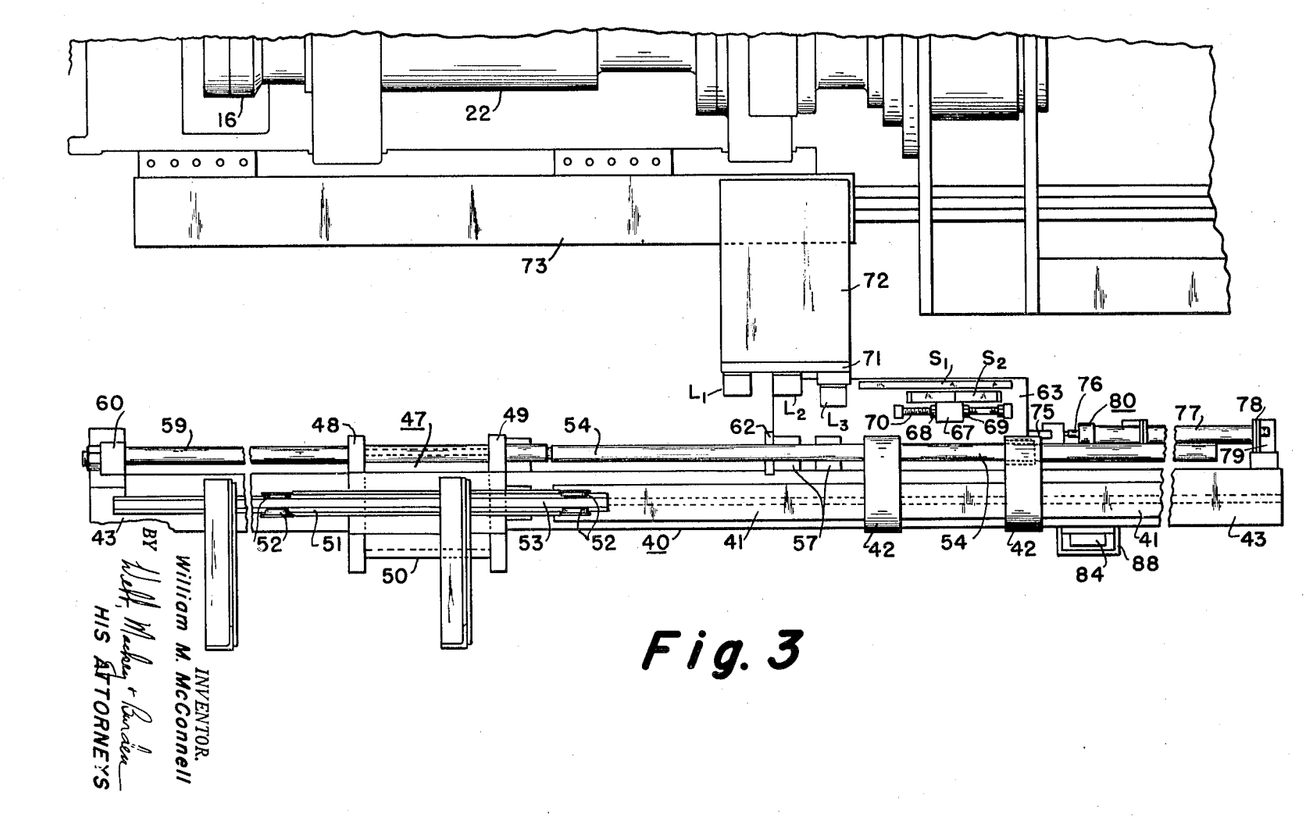
Figure 3 is an enlarged plan view of the positioning apparatus of Figure 1.

As shown in Figures 1 and 2, a hydraulic tester with which the positioning apparatus may be used includes test heads 15 and 16. Head 15 is movably supported between side frames 17 and 18, while head 16 forms part of apparatus movable toward and away from the test head 15. More particularly with respect to head 16, cylinder 19 rigidly supported over the base 20 has a piston 21 coupled with a block 22 which terminates in the test head 16. A valve 23 controls the supply of testing fluid to a passage 24 in the block which extends centrally through the test head 16. The pistons 25 of set-out and pull-back cylinders 26, suitably supported above and below the cylinder 19, move the piston 21 and accessory parts through clevis connections to flanges 27. Test head 15 is equipped to move similarly to test head 16, but the movement of head 15 is ordinarily less than that of head 16 so that the latter is more commonly referred to as the movable test head.

In operation, a pipe is held in position between the heads by clamps 28 and 29 which are operated by cylinders 30 and 31, respectively. Each test head may be actuated in the same manner. For example, fluid admitted to the cylinders 26 pushes the piston 21 outwardly causing the block 22 to ride along rails 33 and moving the test head 16 over an end of the pipe while fluid is drawn into cylinder 19 through valve 32. The head makes a seal about the end of the pipe in accordance with standard practice. Valve 23 then admits test fluid to the pipe through the passage 24, while valve 34 compensates for contraction or elongation of the pipe during the test. For instance, the clamp 29 travels back and forth on ways 35 in accordance with any change in the length of the pipe under test. A rod 36 fixed at one end to legs of the clamp 29 and at the other to a stem of valve 34 follows the movement of clamp 29 and thereby operates the valve. The latter is a four-way servo valve which, when displaced from a neutral position by the rod 36, either supplies additional fluid to the rear of the cylinder 19 through openings 37 and tube 38 or allows for relief therefrom depending upon the direction of displacement. After the testing, pull-back cylinder 26 retract the movable test head 16.

Figure 9:
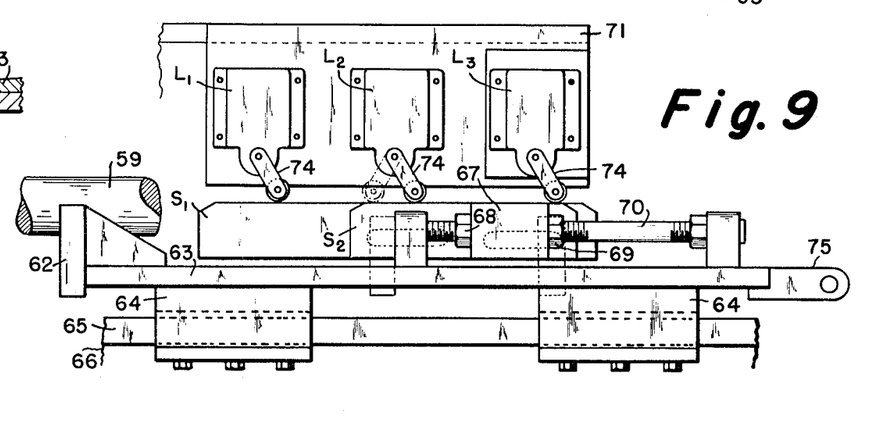
Figures 9 and 10 are front and end views, respectively, of Figure 8.
Figure 10:
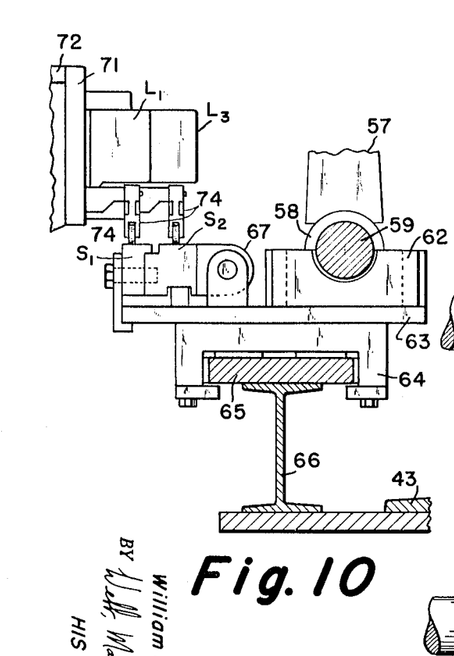

Referring now to the positioning apparatus, the embodiment of Figure 1 includes a table 39 and an aligner 40. As shown in Figures 3 through 7, the aligner comprises a hydraulic or compressed air cylinder 41 carried in brackets 42 supported on an I-beam 43 over standards 44. The piston rod 45 of cylinder 41 has a clevis connection 46 with a head 47 which consists of plates 48 and 49 separated by an angle iron 50. The head 47 depends from an inverted trough 51 having wheels 52 which ride over laterally disposed legs of a rail 53 suspended from above. A pull rod 54 makes a clevis connection 55 with the head 47 and is adapted to slide through openings 56 in the brackets 42. A pair of fixed arms 57 depend from the rod 54 and carry an annular rider 58 which travels a guide rod 59 between an end support 60 and a stop 61. The rider 58 engages a braced lug 62 of a carriage 63 having runners 64 free to slide over a plate 65 fixed to an I-beam 66. The carriage 63 has two parallel strips $S_1$ and $S_2$. Strip $S_1$ is fixed by a clamp, while strip $S_2$ has a leg 67 which may be held by nuts 68 and 69 in any position along a threaded stud 70 held in brackets on the carriage, so that the timing of the function of strip $S_2$ with that of strip $S_1$, hereinafter described, can be altered. The strips engage limit switches $L_1$, $L_2$, and $L_3$ fixed to a wall 71 of a platform 72. The latter, in turn, is secured to a ledge 73 (Figure 1) carried by the block 22 and, therefore, moves with the movable test head 16. Each limit switch has an arm 74. Switches $L_1$ and $L_3$ operate when their arms pivot to the right as in Figure 9, while switch $L_2$ operates when its arm pivots to either side of a neutral vertical position. Strip $S_1$ operates limit switches $L_1$ and $L_2$, and strip $S_2$ operates limit switch $L_3$ set-out from the wall 71 for this purpose.

The carriage 63 has a link 75 making a clevis connection with a piston rod 76 of a cylinder 77. This cylinder is supported in brackets 78 carried on ledges 79 attached to a side of the I-beam 43. A clamp 80 grips the piston rod 76 of cylinder 77 to hold it in a given position. The clamp includes jaws 81 held by support 82. The piston rod 83 of cylinder 84 pivots the upper jaw about a pin 85 by the linkage generally shown at 86. Angle irons 87 support the cylinder 84 on a ledge 88 carried at right angles to and extending through the I-beam 43.

Figure 11:
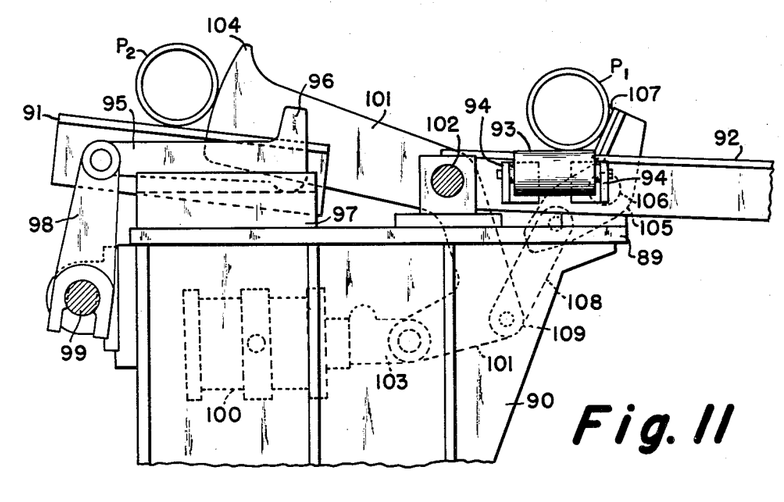
Figure 11 is a section of Figure 1 on the line XI—XI showing an alignment table and feeding apparatus.
Figure 12:
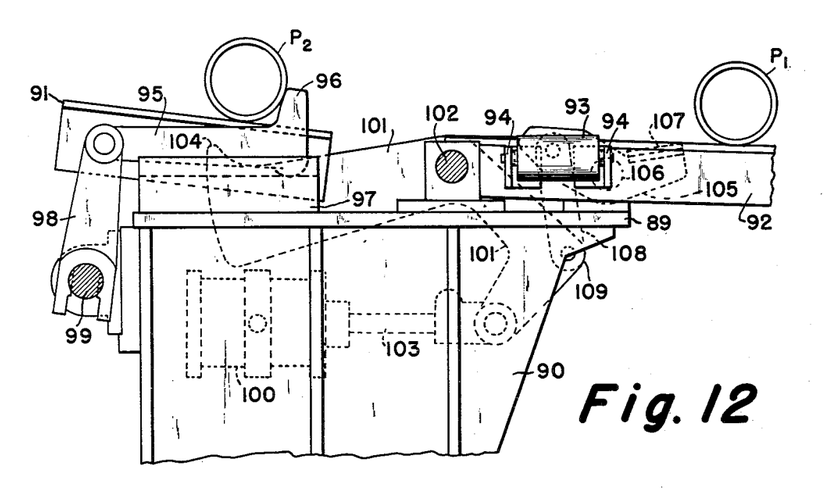
Figure 12 is a section similar to Figure 11 illustrating the feeding apparatus in another position.

The alignment table 39 includes a plurality of stations which, as illustrated in Figures 11 and 12, comprise a base 89 and a support 90. Two fixed skidways 91 and 92 direct pipe over the base 89 and toward the hydraulic tester, respectively. Skidway 92 has a roller 93 mounted at one side in brackets 94. A bar 95 having an end lug 96 rests on a block 97 and pivotally connects with a lever 98 mounted on a shaft 99. Normally, bar 95 is in a fixed position, but it may be adjusted for pipes of different size by turning lever 98 about the shaft 99. The actual transfer of pipe is accomplished by a leverage system operated by a cylinder 100 which is trunnion-mounted between two adjacent supports 90. Lever 101 of the system turns about a shaft 102 journaled on the base 89. Lever 101 also makes a pivotal connection with the piston rod 103 of cylinder 100 at one end and terminates in a stop 104 at the other. A smaller lever 105 turns about a shaft 106 also mounted on the base 89 and has a flat-nosed stop 107 at one end. A link 108 pivotally joins the other end of lever 105 with an elbow 109 of lever 101.

When the piston rod 103 moves out, the levers 101 and 105 pivot to the positions shown in Figure 12. This drops the stop 107 of lever 105 below the skidway 92 and allows pipe $P_1$ to roll by gravity down the skidway 92 to the hydraulic tester. At the same time, the stop 104 of lever 101 falls beneath the skidway 91 permitting pipe $P_2$ which was previously resting against stop 104, to roll down skidway 91 to the lug 96. When the piston rod 103 returns, the upper arm of lever 101 lifts pipe $P_2$ from its seat against the lug, causing pipe $P_2$ to roll down the upper arm onto the roll 93 and against the stop 107 of lever 105 now in its former raised position. Thereafter, the operation is the same as just described.

Sequence of operation

Each step in the use of the present positioning apparatus may, if desired, be separately actuated or manually performed, but it is preferred to join the operation of all the steps by conventional limit switches and a timing circuit positioned about the apparatus and actuated as follows:

1. A pipe $P_1$ is placed on the skidway 91 of the alignment table 39. At the start, cylinder 100 is operated by a push button circuit having a solenoid valve which controls or directs the entrance of compressed air or a hydraulic fluid to the cylinder. The cylinders hereinafter mentioned may be similarly operated. Also, after the first pipe is handled by cylinder 100, its operation is thereafter automatically actuated as later described.

Figure 4:
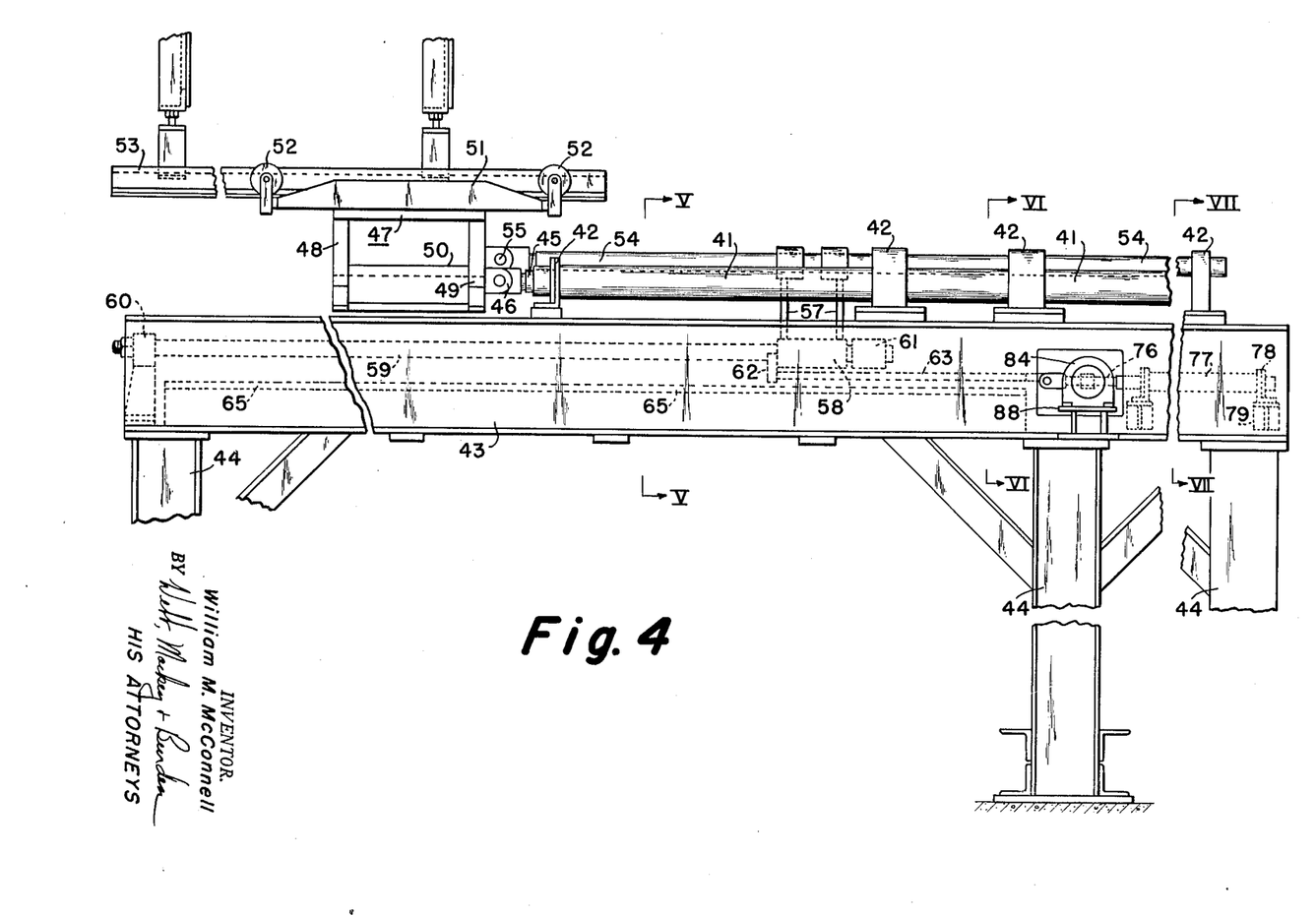
Figure 4 is a front view of Figure 3.
Figure 5:
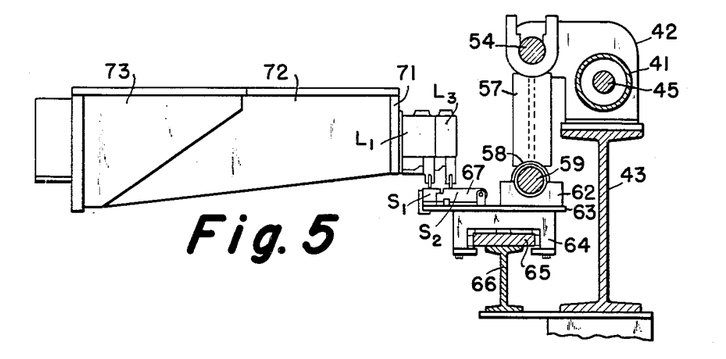
Figures 5, 6, and 7 are sections of Figure 4 on the lines V—V, VI—VI, and VII—VII, respectively.
Figures 6, 7:
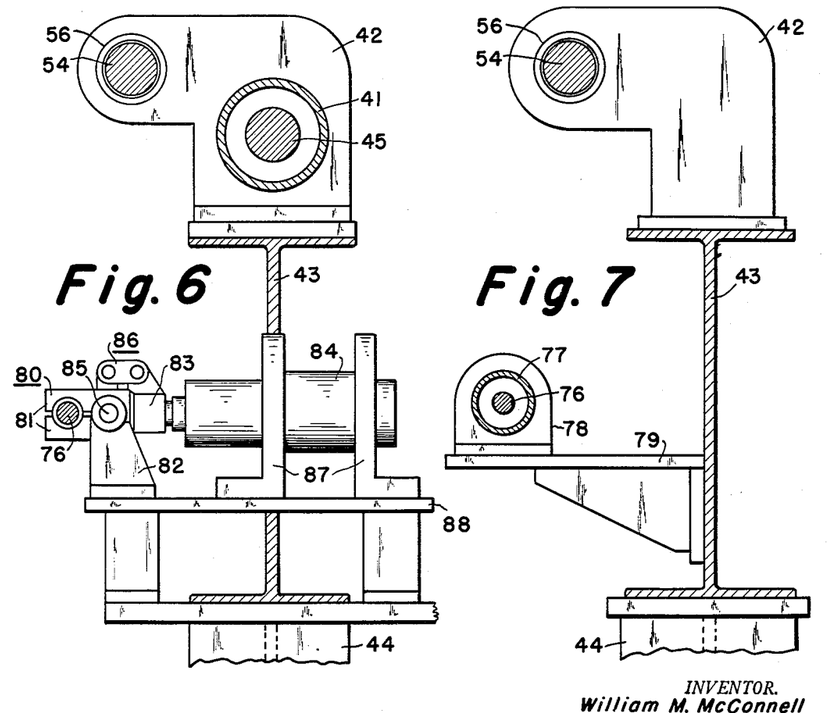
Figure 8:
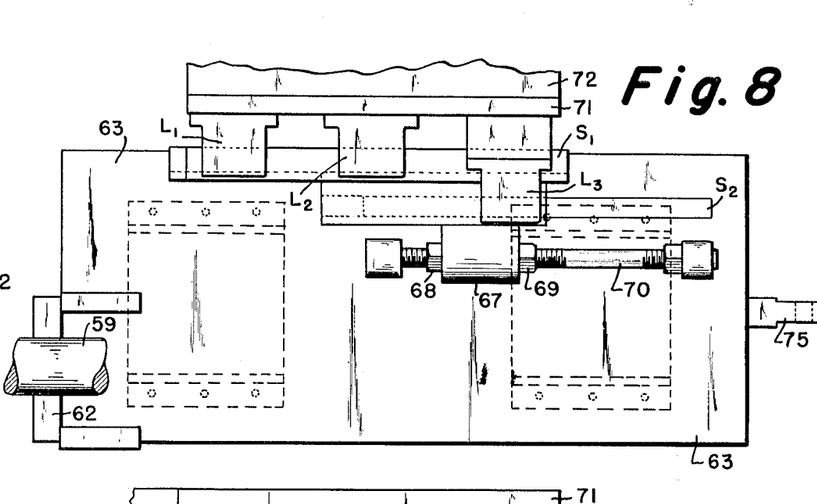
Figure 8 is an enlarged plan view of a carriage of the positioning apparatus.

2. Cylinder 100 transfers pipe $P_1$ to the alignment table, as shown in Figure 11, where the pipe strikes a limit switch of a circuit actuating cylinder 41 (Figure 4). This circuit may also serially contain limit switch $L_3$ of carriage 63 so that at the beginning of continuous automatic operation, limit switch $L_3$ may be shorted out of the circuit as by a push button to enable cylinder 41 to operate. Thereafter, the operation of this cylinder is controlled by limit of switch $L_3$ and the limit switch just mentioned on the alignment table.

3. As cylinder 41 brings head 47 forward, rider 58 is carried by arms 57 along the guide rod 59 and pushes the lug 62 of carriage 63 before it.

4. The head 47 engages an end of pipe $P_1$ on the alignment table and thrusts the opposite end against the stop 110 in Figure 1, thus tripping a limit switch associated with the stop. This switch is contained in a circuit closed for operation by a relay upon completion of the previous test. This circuit:

(a) Operates cylinder 84 to clamp jaws 81 on the piston rod 76 joined to the carriage 63 and thereby hold the carriage in the position determined by the length of pipe $P_1$;

(b) Returns head 47 to its original position by operating cylinder 41; and (c) Operates cylinder 100 thereby transferring pipe $P_1$ to the hydraulic tester and advancing a succeeding pipe $P_2$ to the alignment table on the return stroke of the cylinder, as represented in Figure 12.

Figure 13:
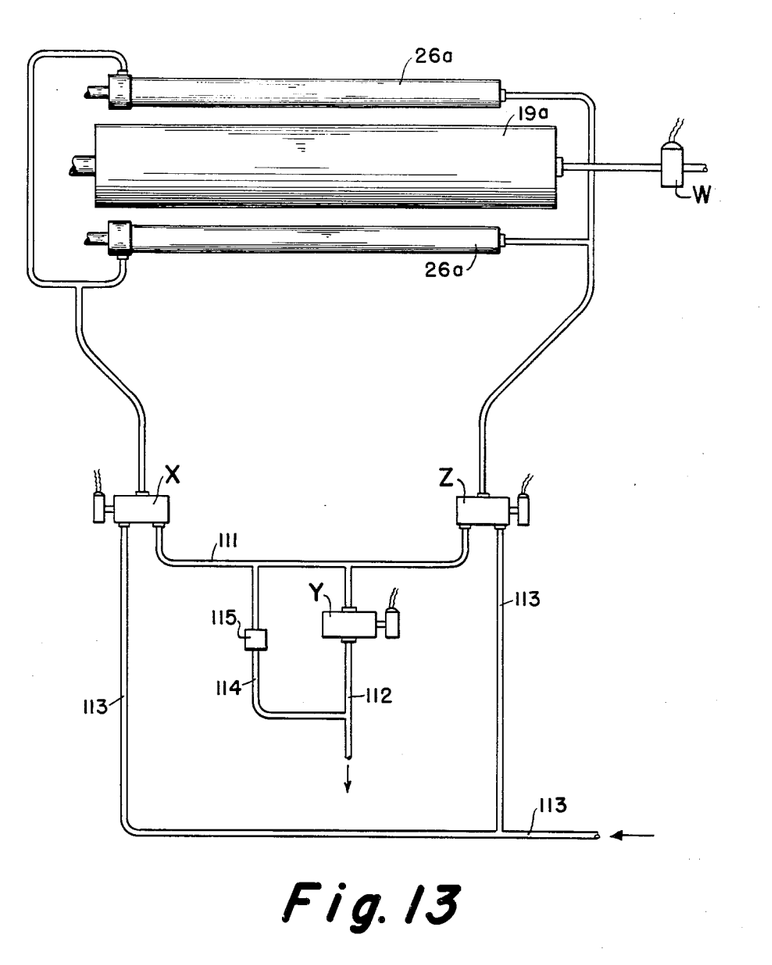
Figure 13 is a schematic flow diagram of the hydraulic circuits for the movable test head.

5. Pipe $P_1$ drops into clamps 28 and 29 of the hydraulic tester tripping a limit switch which operates cylinders 30 and 31 to close those clamps and begin the test head operation in a manner known in the art. For example, with reference to the schematic flow diagram and solenoid-operated valves of Figure 13, two-way valve W opens to cylinder 19a corresponding, respectively, to valve 32 and cylinder 19 of Figure 1; three-way valve X shifts to connect the ends of pull-back cylinders 26a, corresponding to cylinders 26 of Figure 1, to the drain line 111; two-way valve Y opens to the drain 112; and three-way valve Z shifts to connect the rearward ends of cylinders 26a with a supply line 113 of fluid. This forces the movable test head 16 and accessory parts forward including the platform 72 carrying the limit switches $L_1$, $L_2$, and $L_3$. At the same time, fluid enters through valve W.

6. As the movable test head 16 approaches pipe $P_1$, strip $S_1$ actuates limit switch $L_1$. This de-energizes valve Y forcing the discharge from valve X to travel through a by-pass 114 having an orifice 115. The resulting increase in back pressure is transmitted to the cylinders 26a and slows the movement of head 16. Although not essential, this feature is desirable to dissipate the momentum stored in the mass of the moving head 16 and accessory parts.

7. After the head has traveled a short distance at the reduced speed, limit switch $L_3$ contacts strip $S_2$ thereby actuating the former. This de-energizes valves W, X, and Z stopping the test head 16 completely. Closing valve W traps the previously admitted fluid at the rear of cylinder 19a. Valve Z shifts so that the rearward ends of cylinders 26a are open to drain line 111, while valve X shifts to open the forward ends of cylinders 26a to the fluid supply line 113. Since strip $S_2$ can be placed at different stations along the threaded stud 70, the timing of the actuation of limit switches $L_1$ and $L_3$ can be altered.

8. Actuation of limit switch $L_3$ also operates cylinders 84 and 77, the former releasing the piston rod 76 and the latter returning the carriage 63 to its original position.

9. Pipe $P_1$ in the hydraulic tester is now conventionally tested. At the same time and as noted in step 2 above, actuation of limit switch $L_3$ when a succeeding pipe $P_2$ has tripped the limit switch on the alignment table closes a circuit operating cylinder 41 and brings head 47 forward again. Thus, the positioning of pipe $P_2$ with respect to the test heads is accomplished in the same manner as described for pipe $P_1$. Furthermore, no matter if pipe $P_2$ is of the same length, longer, or shorter than pipe $P_1$, the apparatus can adapt the test heads to the length of the succeeding pipe in the following manner.

*Succeeding pipe longer*

10. If the succeeding pipe $P_2$ is longer than pipe $P_1$ the carriage 63 is positioned at some point behind the movable test head 16. When the testing operation for pipe $P_1$ is completed, valves W and Y open in accordance with the technique of operating the hydraulic tester.

11. As soon as valve W is opened, the pressure against the pistons in the pull-back cylinders 26a retracts the piston of cylinder 19a pushing the fluid trapped at the rear of the last cylinder out valve W.

12. Since valve Y is open, the head 16 is retracted at a fast rate until strip $S_1$ on the carriage positioned in accordance with the length of pipe $P_2$ trips limit switch $L_2$. This closes valve Y and establishes a conventional timing circuit of short duration.

13. The head 16 moves back slowly with valve Y closed, due to the back pressure of orifice 115, until the timing circuit expires. At this time, valve W is closed trapping oil at the rear of cylinder 19a and causing the head 16 to stop. The timing circuit allows head 16 to move after actuation of limit switch $L_2$ in order to clear the end of pipe $P_2$ when it is transferred to the test heads.

14. At this time, pipe $P_1$ is ejected from the hydraulic tester by standard means, and the circuit containing the limit switch associated with the stop 110, previously mentioned in step 4, is cleared for action.

15. Accordingly, cylinder 100 of the alignment table is operated as before to advance pipe $P_2$ to the test heads and bring a succeeding pipe $P_3$ onto the alignment table, whereupon the operation as described is repeated.

*Succeeding pipe same length or shorter*

16. Since in these cases the carriage 63 is certain to advance at least as fas as it was when the right-hand end of strip $S_2$ (Figure 8) tripped the approaching limit switch $L_3$ to stop the test head 16, limit switch $L_2$ is certain to be tripped as the carriage 63 is positioned in accordance with the length of pipe $P_2$ during the testing of pipe $P_1$.

17. This time, however, with valve Y already closed, a holding circuit is established which delays the start of the timing circuit mentioned in step 10. The holding circuit is timed to expire shortly after the testing operation is completed.

18. Therefore, at that time, when valves W and Y open and the head 16 is retracted, the holding circuit expires and the timing circuit immediately closes valve Y allowing the head to travel back only at reduced speed and for only a preset distance.

19. As before, when the timing circuit expires valve W closes stopping the head 16. This time the head moves back a short distance in order to clear the end of the pipe in the tester.

20. Again, the hydraulic tester now ejects pipe $P_1$ while the circuit of step 4 operates cylinder 100 to advance pipe $P_2$ to the tester and bring pipe $P_3$ onto the alignment table after which the operation as described is repeated as before.

While the foregoing disclosure described a presently preferred embodiment, it is understood that the invention may be practiced in other forms within the scope of the following claims.

I claim:

1. Positioning apparatus including means to engage an article and position it with respect to receivers adapted to relative movement toward and away from each other and means responsive to the position of the first-mentioned means determined by said positioning of the article to space apart the receivers whereby they may receive the article therebetween, said first-mentioned means being independently movable with respect to said receivers.

2. Positioning apparatus including means to engage an elongated article and position it with respect to a receiver having means to engage the ends of the article and means responsive to the position of the first-mentioned means determined by said positioning of the article to space said end-engaging means whereby the distance between said end-engaging means is at least equal to the length of the elongated article to be received, said first-mentioned means being independently movable with respect to said end-engaging means.

3. Positioning apparatus for aligning an elongated article with respect to a receiver having means to engage the ends thereof, one of said means being movable, said apparatus including a head adapted to engage an end of the article, means to move the head whereby the article is advanced to a positioning station, and means responsive to the extent of said advancement of said head to move said movable end-engaging means whereby the distance between said end-engaging means is at least equal to the length of the elongated article to be received, said means to move the head operating independently with respect to said movable end-engaging means.

4. Apparatus for positioning a pipe, tube, bar, rod, slab, or like article with respect to a receiver having spaced-apart means to engage the ends thereof, said apparatus including a head to engage an end of the pipe or like article, means to move the head whereby the pipe is placed in a desired position, an actuator stationed by the movement of the head, and means responsive to the station of the actuator after the positioning of the pipe to move at least one of the end-engaging means of the receiver whereby the distance between such last-mentioned means is at least equal to the length of the pipe to be received, said means to move the head operating independently with respect to said end-engaging means.

5. Apparatus for positioning successive pipes, tubes, bars, rods, slabs, or like articles of varying lengths for subsequent transfer to a receiver having spaced-apart means to engage the ends thereof, one of said means being movable toward and away from the other, said apparatus including a head to engage an end of a pipe or like article, means to move the head whereby the pipe is placed in a desired position, an actuator carried by the head and adapted to contact the movable end-engaging means of the receiver, and means responsive to said contact to position the movable end-engaging means whereby the distance between such end-engaging means of the receiver is at least equal to the length of the pipe to be next received, said means to move the head operating independently with respect to said end-engaging means.

6. Apparatus for processing successive pipes, tubes, bars, rods, slabs, or like articles of varying lengths including a receiver for the pipes or like articles comprising spaced-apart means to engage the ends of a pipe, one of said means being movable toward and away from the other, and an aligner for positioning the pipe for subsequent transfer to the receiver comprising a head to engage an end of the pipe, means to move the head longitudinally with respect to the pipe whereby the pipe is placed in a desired transfer position, a carriage carried by the head during its movement, a pair of actuators on the carriage each adapted to make releasable contact with the movable end-engaging means of the receiver, means responsive to the contact of one actuator to stop the movement of said end-engaging means, and means responsive to the contact of the other actuator to position said engaging means whereby the distance between such end-engaging means is made at least equal to the length of the pipe to be next received.

7. Apparatus for testing successive elongated articles of varying lengths including spaced-apart test heads for engaging opposite ends of an article, one head being movable toward and away from the other, and an aligner for positioning the elongated articles for subsequent transfer to the test heads comprising a pusher head to engage an end of an article, means to move the pusher head whereby the article is placed in a desired position for transfer to the test heads, a carriage carried by the pusher head during its movement, lugs projecting from the carriage, a platform carried by the movable test head, switches supported by the platform, whereby the relative movement between the carriage and the movable test head engages the lugs with the witches wherein operation of one switch reduces the speed of travel of the movable test head, operation of another switch stops that test head, and operation of a further switch positions that test head with respect to the other whereby the distance between the test heads is at least equal to the length of the article just positioned by the pusher head.

8. Apparatus for testing successive elongated articles of varying lengths including spaced-apart test heads for engaging opposite ends of an article during a test, one head being movable toward and away from the other to accommodate the varying lengths, and an aligner for positioning a succeeding elongated article during the test of a preceding article for subsequent transfer to the test heads comprising a pusher head to engage an end of the article, means to move the pusher head longitudinally with respect to the article whereby the latter is placed in a desired position for subsequent transfer to the test heads, a rod fixed to the pusher head carrying a carriage during the forward movement of the rod, projecting lugs on the carriage, a platform carried by the movable test head, limit switches supported by the platform, whereby the relative movement between the carriage and the platform engages the lugs with the switches and wherein dependent on the position of said carriage operation of one switch reduces the speed of travel of the movable test head, operation of another switch stops that test head, and operation of a further switch positions the movable test head with respect to the other after the testing operation whereby the distance between the test heads is at least equal to the length of the elongated article just positioned by the pusher head.

9. Apparatus for testing successive tubular articles of varying lengths including spaced-apart test heads for engaging opposite ends of an article during a test, one head being movable toward and away from the other to accommodate the varying lengths, and an aligner disposed longitudinally of the test heads for positioning a succeeding tubular article during the test of a preceding article for subsequent transfer to the test heads comprising an alignment table, a pusher head to engage an end of the article, means to move the pusher head longitudinally with respect to the article to locate the same in a desired position on the alignment table, a rod fixed to the pusher head, a carriage adapted to move parallelly with the pusher head, means on the rod to move the carriage during the forward movement of the rod, means to lock the carriage at its station after the positioning of the article, projecting lugs on the carriage, a platform carried by the movable test head, limit switches supported by the platform, whereby upon the approach of the movable test head toward the other the lugs engage the switches wherein operation of one switch by the position of the carriage as determined by the length of the tubular article presently between the test heads reduces the speed of travel of the movable test head, operation of another switch by the position of the carriage stops that test head, and operation of a further switch by a new position of the carriage as determined by the length of the succeeding tubular article positions the movable test head with respect to the other after the testing operation whereby the distance between the test heads is then at least equal to the length of the succeeding tubular article.

10. A machine for hydraulically testing successive pipes of varying lengths including a pair of aligned test heads each adapted to receive an end of a pipe to be tested and make a water-tight joint therewith, one head being movable toward and away from the other to accommodate the varying lengths, and an aligner disposed longitudinally of the test heads for positioning a succeeding pipe during the test of a preceding one for subsequent transfer to the test heads and for accounting for any change in length of the succeeding pipe, said aligner comprising an alignment table having a stop adjacent the test heads, means to advance a pipe onto the table, a pusher head to engage an end of the pipe on the table, means to move the pusher head to advance the opposite end of the pipe against the stop on the alignment table, a rod fixed at one end to the pusher head, a second rod paralleling the first, a carriage mounted on the second rod, an arm on the first rod to move the carriage along the second rod during the forward movement of the first rod, means to lock the carriage at its station on the second rod as determined by the positioning of the pipe, means to eject the pipe from the alignment table to the test heads, a pair of projecting strips on the carriage, adjusting means to move one strip with respect to the other whereby the timing of their respective functions can be altered, a platform carried by the movable test head, limit switches supported by the platform and operated by the strips on the carriage, whereby upon the approach of the movable test head toward the other to engage the ends of a pipe therebetween, operation of one switch by the position of the first strip as determined by the setting of the carriage in accordance with the length of the pipe presently between the test heads reduces the speed of travel of the movable test head, operation of a second switch by the position of the second strip similarly determined stops that test head, and operation of a third switch by the first strip from a new position of the carriage as determined by the length of the succeeding pipe then positioned on the alignment table positions the movable test head with respect to the other after the preceding testing operation whereby the distance between the test heads is then at least equal to the length of the succeeding pipe on the alignment table and that pipe can be readily transferred to the test heads.

11. A machine as claimed in claim 10 including means responsive to the contact of the pipe with the stop on the alignment table to operate the carriage locking means, pipe ejecting means, and pipe advancing means whereby a pipe is delivered to the test heads and a succeeding pipe advanced to the alignment table.

12. Positioning apparatus including means to engage an article and position it with respect to receivers adapted to relative movement toward and away from each other and means responsive to the positioning of the first-mentioned means determined by said positioning of the article to stop the movement of one of said receivers toward the other at a distance at least equal to the length of the article, said first-mentioned means being independently movable with respect to said receivers.

13. Positioning apparatus for aligning an elongated article with respect to a receiver having means to engage the ends thereof, one of said means being movable, said apparatus including a head adapted to engage an end of the article, means to move the head whereby the article is advanced to a positioning station, means to transfer the article from said station to the end-engaging means, and means responsive to the extent of said advancement of said head to stop the movement of the movable end-engaging means toward the other at a distance substantially equal to the length of the article received, said means to move the head operating independently with respect to said movable end-engaging means.

14. Positioning apparatus including means to engage an article and position it with respect to receivers adapted to relative movement toward and away from each other, means responsive to the position of the first-mentioned means determined by said positioning of the article to space apart the receivers whereby they may receive the article therebetween, and further means also responsive to the positioning of the first-mentioned means determined by said positioning of the article to stop the movement of one of said receivers toward the other at a distance at least equal to the length of the article, said first-mentioned means being independently movable with respect to said receivers.

15. Positioning apparatus for aligning an elongated article with respect to a receiver which has means to engage the ends thereof, one of said means being movable, said apparatus including a head adapted to engage an end of the article, means to move the head whereby the article is advanced to a positioning station, means responsive to the extent of said advancement of said head to move said movable end-engaging means whereby the distance between such means is at least equal to the length of the elongated article to be received, means to transfer the article from said positioning station to the end-engaging means, and means also responsive to the extent of said advancement to stop the movement of the movable end-engaging means toward the other at a distance substantially equal to the length of the article received, said first-mentioned means being independently movable with respect to said receivers.

References Cited in the file of this patent

UNITED STATES PATENTS

| | | |
|---|---|---|
| 2,523,563 | Foreman | Sept. 26, 1950 |
| 2,655,066 | Siegerist | Oct. 13, 1953 |
| 2,671,338 | Reichl | Mar. 9, 1954 |
| 2,679,748 | Kent et al. | June 1, 1954 |

FOREIGN PATENTS

| | | |
|---|---|---|
| 401,621 | Great Britain | Nov. 16, 1933 |